April 6, 1926.
L. W. BUTLER
1,579,857
TOOL FOR REMOVING BATTERY TERMINALS
Filed March 19, 1923
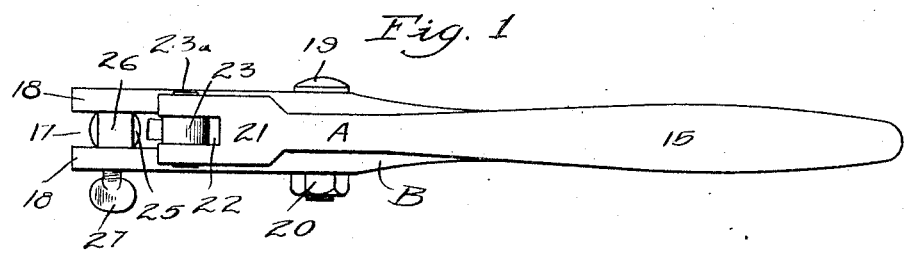
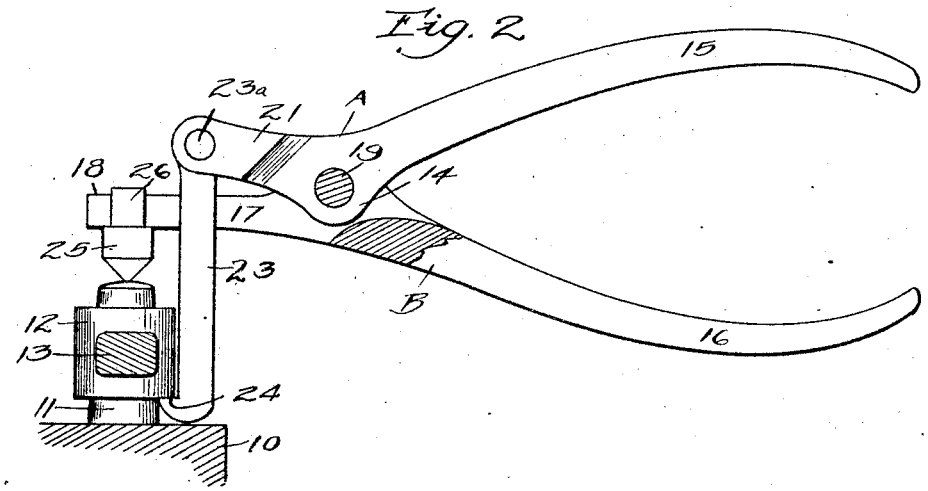
Witness
Lynn Latta
Inventor
Lloyd W. Butler
By Bair & Drewman
Attys Patented Apr. 6, 1926.

1,579,857

UNITED STATES PATENT OFFICE.

LLOYD W. BUTLER, OF DES MOINES, IOWA.

TOOL FOR REMOVING BATTERY TERMINALS.

Application filed March 19, 1923. Serial No. 626,038.

*To all whom it may concern:*

Be it known that I, LLOYD W. BUTLER, a citizen of the United States, and a resident of Des Moines, in the county of Polk and State of Iowa, have invented a certain new and useful Tool for Removing Battery Terminals, of which the following is a specification.

My invention contemplates primarily, the providing of a tool which may be used to remove corroded battery terminal connections.

A further object is to provide a battery terminal connection remover which is of simple and inexpensive construction, and which will very effectively remove connections which have become corroded and very firmly fixed to the terminal post, or which are so eaten away by corrosion that any ordinary tool will not readily disengage the connection.

More particularly, my invention relates to a tool, as referred to, in which a pair of levers or arms are pivoted together and so extended as to form a fixed jaw and a swinging jaw support to which is pivoted a swinging jaw in the shape of a hook adapted to coact with the fixed jaw.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 is a plan view of a form of my device.

Figure 2 is a side elevation of the tool, illustrated as it may be used for removing a battery connection, a portion of the tool being broken away.

In the accompanying drawings, I have used the reference numeral 10 to indicate generally the body of a storage battery. Projecting above the battery 10 is the terminal post 11 on which is generally fixed the bushing 12 of a terminal connection 13. Ordinarily the connection is fastened to the post 11 by means of a pair of ears (not shown) which project laterally from the bushing 12 at a point where the portion 12 is cut through to form a split ring.

It is well known that the electrolyte used in the storage cell is such as to rapidly corrode the lead of the battery terminal post and connection. The result is that the connection becomes rigidly attached to the post so that in many cases, it is almost impossible to remove it. In such a case, it is highly desirable to have the use of a tool which will quickly remove the connection without injuring the storage battery in any way.

If a lever is used to pry up against the under edge of the connection the top of the battery may be injured since it is necessary to exert a great deal of force in many cases.

My tool comprises two members A and B, which have the general shape of obtuse angles. This forms on the member A, a heel 14. The members A and B are extended in one direction to form a pair of handles 15 and 16, respectively.

The member B has an extended portion which is divided by a slot 17 into the two arms 18. The slot 17 extends beyond the bend in the member B and there is thus provided a pair of ears between which the heel 14 is received.

A pivot bolt 19 connects the members A and B together and is secured in place by a nut 20. The member A has an extension 21 which forms a hook supporting member. The members A and B are so arranged that the handles 15 and 16 extend in one direction from the pivot bolt 19 and away from each other and, the member 21 extends slightly away from the member B on the same side as the handle 15. The member 21 is enlarged and has a slot 22. A swinging jaw member 23 is pivoted in the slot 22 by means of a pivot pin 23ª. The swinging jaw member 23 has the jaw 24.

In Figure 2 the jaw 24 is shown as being a short hook or lug which is sufficient to engage the under edge of a battery connection. The hook 23 crosses the arms 18 and is extended through the slot 17. A sharpened lug 25 has a shank 26 which is received between the arms 18 and held in place by means of a set screw 27.

The lug 25 may be adjusted slightly longitudinally by loosening the set screw 27, or may be removed altogether, in which case the lower edges of the arms 18 will serve as jaws for a wrench or the like.

It will be understood that the jaw 24 may be extended substantially parallel with the arms 18 and that when the tool is used as a wrench the jaw 24 will coact with the underside of the arms 18.

When my tool is used as a battery connection remover, the jaw 24 is inserted under the edge of the connection, as illustrated in Figure 2 or it may be inserted under the arm 13 of the connection.

The lug 25 is placed against the top of the battery post 11. When the handles 15 and 16 are drawn toward each other, it will be seen that the swinging jaw member 23 will move toward the arms 18. In actual practice, it may be found convenient to place the lug 25, first on the top of the post and then to swing the jaw member 23 into place.

It will be seen that by adjusting the distance between the lug 25 and jaw 24, and by swinging the jaw member 23 backward, any size of connection within reasonable limits can be removed.

It will be seen that I have provided a very simple and inexpensive tool which is of the necessary substantial construction for removing the connection from the battery and will do so without injuring the battery or terminal.

Some changes may be made in the construction and arrangement of the various parts of my invention, without departing from the real spirit and purpose of my invention, and it is my intention to cover by my claim, any modified forms of structure of use of mechanical equivalents, which may be reasonably included within its scope.

I claim as my invention:

A combination tool comprising a pair of handles, pivoted together, one of said handles being extended beyond the pivot point to form a supporting member, the other of said handles being extended adjacent to said member and bifurcated, a jaw member pivoted to the supporting member and extended between the arms of the bifurcated member to form a swinging jaw member adapted to coact with the bifurcated member as a jaw, and an adjustable sharpened lug carried between the arms of the bifurcated member.

LLOYD W. BUTLER.